(12) United States Patent
Hatano et al.

(10) Patent No.: US 10,261,227 B2
(45) Date of Patent: Apr. 16, 2019

(54) METHOD FOR PRODUCING RETARDATION FILM

(71) Applicant: ZEON CORPORATION, Tokyo (JP)

(72) Inventors: Taku Hatano, Tokyo (JP); Kohei Arakawa, Tokyo (JP); Shunsuke Yamanaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/702,312

(22) Filed: May 1, 2015

(65) Prior Publication Data

US 2015/0234107 A1    Aug. 20, 2015

Related U.S. Application Data

(63) Continuation of application No. 12/371,307, filed on Feb. 13, 2009, now Pat. No. 9,050,763.

(60) Provisional application No. 61/080,963, filed on Jul. 15, 2008.

(30) Foreign Application Priority Data

Feb. 14, 2008 (JP) ................................. 2008-033781

(51) Int. Cl.
| | | |
|---|---|---|
| *B29C 55/14* | (2006.01) | |
| *G02B 5/30* | (2006.01) | |
| *B29D 11/00* | (2006.01) | |
| *B29C 47/06* | (2006.01) | |
| *B29C 47/00* | (2006.01) | |
| *B29C 55/02* | (2006.01) | |
| *B29C 55/04* | (2006.01) | |
| *B29C 59/12* | (2006.01) | |
| *B29C 59/14* | (2006.01) | |
| *G02F 1/13363* | (2006.01) | |
| *B29L 11/00* | (2006.01) | |
| *B29L 31/34* | (2006.01) | |
| *B29K 25/00* | (2006.01) | |
| *B29K 69/00* | (2006.01) | |

(52) U.S. Cl.
CPC ........ *G02B 5/3083* (2013.01); *B29C 47/0057* (2013.01); *B29C 47/065* (2013.01); *B29C 55/023* (2013.01); *B29C 55/045* (2013.01); *B29C 55/143* (2013.01); *B29D 11/0073* (2013.01); *B29C 47/0021* (2013.01); *B29C 47/0064* (2013.01); *B29C 59/12* (2013.01); *B29C 59/14* (2013.01); *B29K 2025/04* (2013.01); *B29K 2069/00* (2013.01); *B29K 2995/0018* (2013.01); *B29K 2995/0034* (2013.01); *B29L 2011/00* (2013.01); *B29L 2011/0066* (2013.01); *B29L 2031/3475* (2013.01); *G02F 1/13363* (2013.01); *Y10T 428/31507* (2015.04)

(58) Field of Classification Search
CPC ....... B29C 55/023; B29C 55/12; B29C 55/14; B29C 55/143; B29C 55/146
See application file for complete search history.

(56) References Cited

U.S. PATENT DOCUMENTS

| | | |
|---|---|---|
| 5,270,160 A | 12/1993 | Hiraoka et al. |
| 2002/0005925 A1 | 1/2002 | Arakawa |
| 2002/0135728 A1 | 9/2002 | Tatsuta et al. |
| 2005/0096431 A1 | 5/2005 | Fujii et al. |
| 2009/0103012 A1 | 4/2009 | Itadani et al. |
| 2009/0135483 A1 | 5/2009 | Asano et al. |

FOREIGN PATENT DOCUMENTS

| | | |
|---|---|---|
| JP | 2-160204 A | 6/1990 |
| JP | 2-285304 A | 11/1990 |
| JP | 3-24502 A | 2/1991 |
| JP | 3-141303 A | 6/1991 |
| JP | 5-27119 A | 2/1993 |
| JP | 5-157911 A | 6/1993 |
| JP | 2002-40258 A | 2/2002 |
| JP | 2002-156525 A | 5/2002 |
| WO | WO 2005/050300 A1 | 6/2005 |
| WO | WO 2007/023988 A1 | 3/2007 |
| WO | WO 2007/099927 A1 | 9/2007 |

*Primary Examiner* — Jeremiah R Smith

(74) *Attorney, Agent, or Firm* — Birch, Stewart, Kolasch & Birch, LLP

(57) ABSTRACT

A method for producing a retardation film comprising the steps of: co-extruding or simultaneously casting a thermoplastic resin A and a thermoplastic resin B to obtain a laminated film comprising a layer of the thermoplastic resin A and a layer of the thermoplastic resin B; and uniaxially stretching the laminated film at least twice to cross a molecular orientation axis in the layer of the thermoplastic resin A and a molecular orientation axis in the layer of the thermoplastic resin B each other at almost right angles.

32 Claims, 1 Drawing Sheet

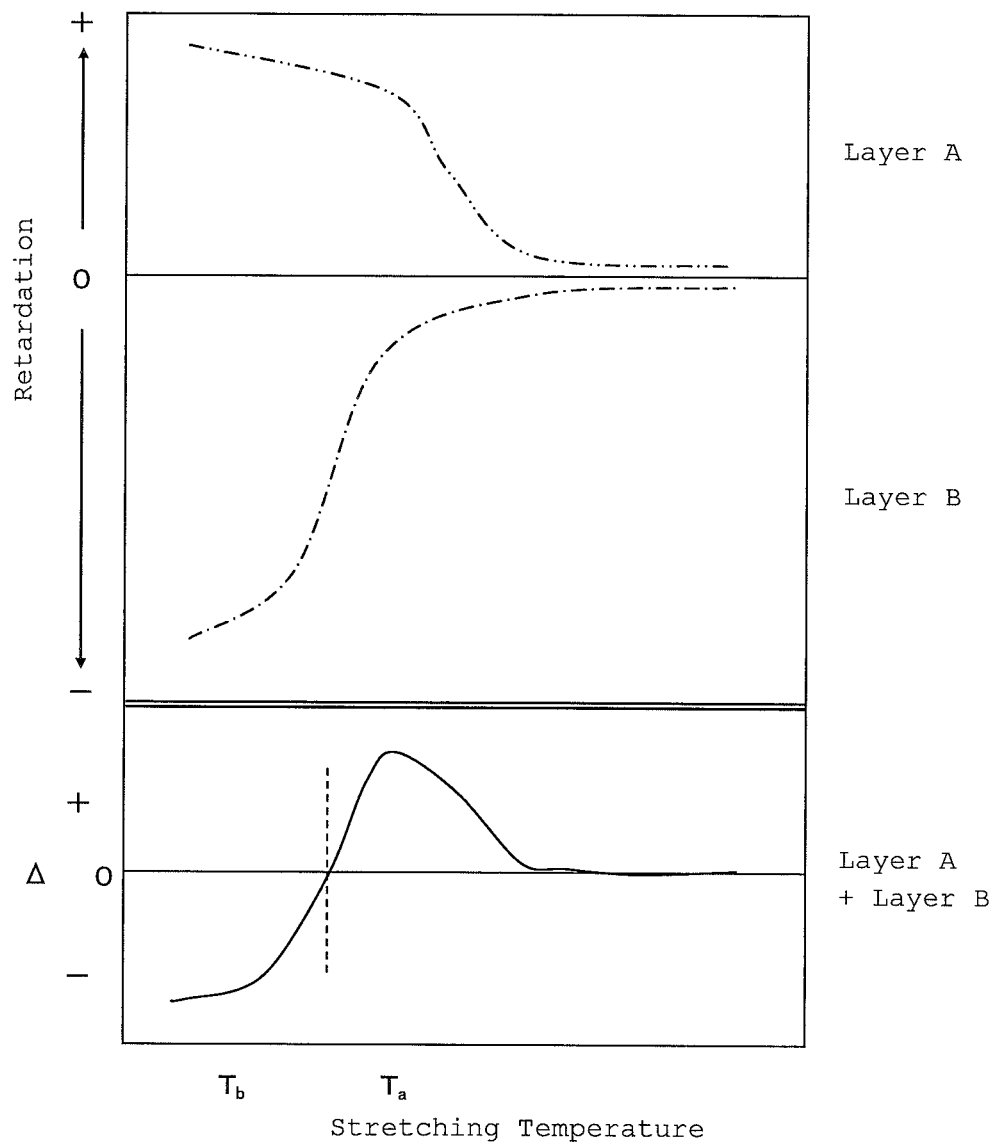

METHOD FOR PRODUCING RETARDATION FILM

This application is a Continuation of application Ser. No. 12/371,307, filed on Feb. 13, 2009, now U.S. Pat. No. 9,050,763, which claims priority under 35 U.S.C. § 119(e) to U.S. Provisional Application No. 61/080,963, filed on Jul. 15, 2008, and under 35 U.S.C. § 119(a) to Application No. 2008-033781, filed in JAPAN on Feb. 14, 2008, all of which are hereby expressly incorporated by reference into the present application.

TECHNICAL FIELD

The present invention relates to a method for producing a retardation film. More particularly, the present invention relates to a method for producing a retardation film suitable for birefringence compensation of a liquid crystal display device.

BACKGROUND OF THE ART

In a liquid crystal display device, to improve contrast of the display and to match color tone, it is required that the retardation film used in the liquid crystal display device fulfills the function enough for all incident light of a visible light range. That is, it is required that retardation of light having a short wavelength is small and retardation of light having a long wavelength is big. More specifically, it is required that a relation of $R_{450}<R_{550}<R_{650}$ is satisfied, in which $R_{450}$ is retardation of light having a wavelength of 450 nm at an incident angle of 0 degrees, $R_{550}$ is retardation of light having a wavelength of 550 nm at an incident angle of 0 degrees, and $R_{650}$ is retardation of light having a wavelength of 650 nm at an incident angle of 0 degrees.

In Patent Document 1, a retardation film which is manufactured by laminating a stretched film which is large in phase difference and small in Abbe number on a stretched film which is small in phase difference and large in Abbe number so that optical axes cross at almost right angles is disclosed as a film that satisfies a relation of $R_{450}<R_{550}<R_{650}$.

Patent Document 2 discloses a retardation film which is manufactured by sticking a stretched film of which a ratio of retardation at a wavelength of 450 nm and retardation at a wavelength of 550 nm is 1.00 to 1.05 and a stretched film of which a ratio of retardation at a wavelength of 450 nm and retardation at a wavelength of 550 nm is 1.05 to 1.20. In these methods described in the Patent Document 1 or the Patent Document 2, an accurate axis match is required when films are stuck together.

Patent Document 3 and Patent Document 4 discloses a retardation film obtained by uniaxially stretching a laminated body composed of a layer of a resin having a positive intrinsic birefringence and a layer of a resin having a negative intrinsic birefringence, in which a direction of a molecular orientation of the layer of the resin having a positive intrinsic birefringence and a direction of a molecular orientation of the layer of the resin having a negative intrinsic birefringence are parallel.

Moreover, a retardation film which satisfies a relation of $0.92 \leq R_{40}/Re \leq 1.08$, in which Re is a retardation value at an incident angle of 0 degrees, and $R_{40}$ is a retardation value at an incident angle of 40 degrees; and a retardation film which satisfies a relation of $n_x > n_z > n_y$, in which $n_x$ is a refractive index in a direction of a slow axis in a plane of the film, $n_y$ is a refractive index in a direction perpendicular to the direction of the slow axis in the plane, and $n_z$ is a refractive index in a thickness direction are suggested to decrease dependence of color tone on an angle in a liquid crystal display device.

Patent Document 5 discloses that a first anisotropic film is obtained by uniaxially stretching a polycarbonate resin film; on the other hand, a second anisotropic film is obtained by uniaxially stretching a polystyrene resin film, and then the first anisotropic film and the second anisotropic film are overlapped so that the directions of stretching of the films are at a right angle to each other to obtain a retardation film which satisfies relation of $n_x > n_z > n_y$.

In addition, Patent Document 6 discloses that a first anisotropic film is obtained by uniaxially stretching a polycarbonate resin film; on the other hand, a second anisotropic film is obtained by uniaxially stretching a polystyrene resin film, and then the first anisotropic film and the second anisotropic film are overlapped so that the directions of stretching of the films are at a right angle to each other to obtain a retardation film which satisfies a relation of $(Re-Re_{40})/Re \leq 0.07$. In these producing methods described in Patent Document 5 or Patent Document 6, an accurate axis match is required when films are stuck together.

Patent Document 7 discloses that a laminated body is formed by bonding a shrinkable film to one side or both sides of a resin film before the resin film is stretched, and then the laminated body is stretched and heated to apply contractive force to the laminated body in a direction orthogonal to the direction of stretching of the above-mentioned resin film to obtain a retardation film which satisfies a relation of $0 < (n_x - n_z)/(n_x - n_y) < 1$.

In the producing method described in Patent Document 7, the contractive force should be controlled accurately.

Patent Document 8 discloses that a rod is obtained by extrusion of a melted polycarbonate resin, then a disc is obtained by slicing up the rod in round, a rectangular plate is obtained by cutting the disc, and then the rectangular plate is uniaxially stretched to obtain a retardation film which satisfies a relation of $0.92 \leq Re_{40}/Re \leq 1.08$. However, it is difficult to manufacture the retardation film having a large area by the method described in the Patent Document 8.

PRIOR ART DOCUMENTS

[Patent Document 1] Japanese Patent Application Laid-Open No. Heisei 2 (1990)-285304
[Patent Document 2] Japanese Patent Application Laid-Open No. Heisei 5 (1993)-27119
[Patent Document 3] Japanese Patent Application Laid-Open No. 2002-40258
[Patent Document 4] Japanese Patent Application Laid-Open No. 2002-156525
[Patent Document 5] Japanese Patent Application Laid-Open No. Heisei 3 (1991)-24502
[Patent Document 6] Japanese Patent Application Laid-Open No. Heisei 3 (1991)-141303
[Patent Document 7] Japanese Patent Application Laid-Open No. Heisei 5 (1993)-157911
[Patent Document 8] Japanese Patent Application Laid-Open No. Heisei 2 (1990)-160204

SUMMARY OF THE INVENTION

Problems to be Resolved by the Invention

An object of the present invention is to provide a method for producing a retardation film comprising a laminate of a plurality of layers so that the molecular orientation axes of the layers cross each other at right angles, with good productivity, and without needing the step of sticking together to match the axis.

In addition, an object of the present invention is to provide a simple and high-accuracy method for producing a retardation film having a large area which satisfies a relation of $R_{450}<R_{550}<R_{650}$, in which $R_{450}$ is a retardation value of light having a wavelength of 450 nm at an incident angle of 0 degrees, $R_{550}$ is a retardation value of light having a wavelength of 550 nm at an incident angle of 0 degrees, and $R_{650}$ is a retardation value of light having a wavelength of 650 nm at an incident angle of 0 degrees; or a retardation film having a large area which satisfies a relation of $0<(n_x-n_z)/(n_x-n_y)<1$, in which $n_x$ is a refractive index in a direction of a slow axis in a plane of the film, $n_y$ is a refractive index in a direction perpendicular to the direction of the slow axis in the plane, and $n_z$ is a refractive index in a thickness direction.

Means for Solving the Problems

As the result of studies by the present inventors to achieve the above-mentioned object, it was found that a laminated film comprising a layer of thermoplastic resin A and a layer of thermoplastic resin B is obtained by coextrusion or simultaneously casting the thermoplastic resin A and the thermoplastic resin B; a molecular orientation axis in the layer of the thermoplastic resin A and a molecular orientation axis in the layer of the thermoplastic resin B were crossed each other at almost right angles by uniaxially stretching the laminated film at least twice; and then a retardation film which satisfies a relation of $R_{450}<R_{550}<R_{650}$ or a retardation film which satisfies a relation of $0<(n_x-n_z)/(n_x-n_y)<1$ can be manufactured simply, extensively and accurately. The inventors advanced study further on the basis of these findings, then the present invention has been completed.

That is, the present invention includes the following modes.

(1) A method for producing a retardation film comprising steps of:
co-extruding or simultaneously casting thermoplastic resin A and thermoplastic resin B to obtain a laminated film comprising a layer of the thermoplastic resin A and a layer of the thermoplastic resin B, and
uniaxially stretching the laminated film at least twice to cross a molecular orientation axis in the layer of the thermoplastic resin A and a molecular orientation axis in the layer of the thermoplastic resin B each other at almost right angles.

(2) The method for producing a retardation film according to the above (1), in which an absolute value of difference between a deflection temperature under load $Ts_A$ of the thermoplastic resin A and a deflection temperature under load $Ts_B$ of the thermoplastic resin B is 5° C. or more.

(3) The method for producing a retardation film according to the above (1) or (2), in which both a rupture elongation of the thermoplastic resin A at the temperature $Ts_B$ and a rupture elongation of the thermoplastic resin B at the temperature $Ts_A$ are 50% or more.

(4) The method for producing a retardation film according to any one of the above (1) to (3), in which the thermoplastic resin A has a positive or negative intrinsic birefringence and the thermoplastic resin B has an intrinsic birefringence of same sign as a sign of the thermoplastic resin A.

(5) The method for producing a retardation film according to the above (4), in which the retardation film satisfies a relation of $R_{450}<R_{550}<R_{650}$, in which $R_{450}$ is a retardation value of light having a wavelength of 450 nm at an incident angle of 0 degrees, $R_{550}$ is a retardation value of light having a wavelength of 550 nm at an incident angle of 0 degrees, and $R_{650}$ is a retardation value of light having a wavelength of 650 nm at an incident angle of 0 degrees.

(6) The method for producing a retardation film according to any one of the above (1) to (3), in which the thermoplastic resin A has either a positive or negative intrinsic birefringence and the thermoplastic resin B has an intrinsic birefringence of a different sign from a sign of the thermoplastic resin A.

(7) The method for producing a retardation film according to the above (6), in which the retardation film satisfies a relation of $0<(n_x-n_z)/(n_x-n_y)<1$, in which $n_x$ is a refractive index in a direction of a slow axis in a plane of the film, $n_y$ is a refractive index in a direction perpendicular to the direction of the slow axis in the plane, and $n_z$ is a refractive index in a thickness direction.

(8) The method for producing a retardation film according to any one of the above (1) to (7), in which the stretching temperature in uniaxially stretching is different at each time.

(9) A retardation film which is obtained by the producing method according to any one of the above (1) to (8).

Advantages of the Invention

According to the method for producing a retardation film in the present invention, the retardation film which satisfies a relation of $R_{450}<R_{550}<R_{650}$, in which $R_{450}$ is a retardation value of light having a wavelength of 450 nm at an incident angle of 0 degrees, $R_{550}$ is a retardation value of light having a wavelength of 550 nm at an incident angle 0 of degrees, and $R_{650}$ is a retardation value of light having a wavelength of 650 nm at an incident angle of 0 degrees; or the retardation film which satisfies a relation of $0<(n_x-n_z)/(n_x-n_y)<1$, in which $n_x$ is a refractive index in a direction of a slow axis in a plane of the film, $n_y$ is a refractive index in a direction perpendicular to the direction of the slow axis in the plane, and $n_z$ is a refractive index in a thickness direction can be manufactured simply, extensively and accurately.

BRIEF DESCRIPTION OF THE DRAWINGS

FIG. 1 shows a temperature dependence of retardations of layer A, layer B, and a laminate of layer A and layer B.

BEST MODE FOR CARRYING OUT THE INVENTION

The method for producing a retardation film in the present invention comprises a step of coextruding or simultaneously casting thermoplastic resin A and thermoplastic resin B to obtain a laminated film comprising a layer of the thermoplastic resin A and a layer of the thermoplastic resin B, and a step of uniaxially stretching the laminated film at least twice to cross a molecular orientation axis in the layer of the thermoplastic resin A and a molecular orientation axis in the layer of the thermoplastic resin B each other at almost right angles.

The "almost right angles" means that an angle of a direction of molecular orientation in the layer of the thermoplastic resin A and a direction of molecular orientation in the layer of the thermoplastic resin B is almost right angle. The angle is preferably 70 degrees to 110 degrees, more preferably 80 degrees to 100 degrees, and particularly preferably 85 degrees to 95 degrees.

Thermoplastic resin A and thermoplastic resin B used in the present invention are thermoplastic resins having an positive or negative intrinsic birefringence. In this specification, a positive intrinsic birefringence means that a refractive index in a stretching direction is larger than a refractive index in a direction perpendicular to the stretching direction, and a negative intrinsic birefringence means that a refractive index in a stretching direction is smaller than a refractive index in a direction perpendicular to the stretching direction. The intrinsic birefringence may be calculated from the permittivity distribution.

A thermoplastic resin having a positive intrinsic birefringence includes olefin resins such as polyethylene, polypropylene, and the like; polyester resins such as polyethylene terephthalates, polybutylene terephthalates, and the like; polyarylene sulfide resins such as polyphenylene sulfides, and the like; polyvinyl alcohol resins, polycarbonate resins, polyarylate resins, cellulose ester resins, polyether sulfone resins, polysulfone resins, polyallyl sulfone resins, polyvinyl chloride resins, norbornene resins, rod-like liquid crystalline polymers and the like. The resin may be used as single or in combination of two or more. In the present invention, among these resins, polycarbonate resins is preferable according to the viewpoint of an appearance of a phase difference, a stretching property at a low temperature, and an adhesive quality with another layer.

A thermoplastic resin having a negative intrinsic birefringence includes polystyrene resins such as homopolymer of styrene or styrene derivatives, copolymers thereof with other monomer and so on; polyacrylonitrile resins, polymethyl methacrylate resins, or multi-component copolymers thereof and the like. The resin may be used as single or in combination of two or more. Preferable examples of other monomer which is contained in the polystyrene resins include acrylonitrile, maleic anhydride, methyl methacrylate, and the butadiene. In the present invention, among these resins, polystyrene resins is preferable in the viewpoint of an excellent appearance of a phase difference, and moreover copolymer of styrene or styrene derivatives and maleic anhydride is especially preferable in the point of excellent thermal stability.

A deflection temperature under load Ts of the above-mentioned thermoplastic resin is preferably 80° C. or more, more preferably 110° C. or more, and particularly preferably 120° C. or more. When the deflection temperature under load is lower than the above-mentioned lower limit value, an orientation easily relaxes.

An absolute value of a difference between a deflection temperature under load $Ts_A$ of a thermoplastic resin A and a deflection temperature under load $Ts_B$ of a thermoplastic resin B is preferably 5° C. or more, and more preferably 5 to 40° C., and especially preferably 8 to 20° C. When the difference of the temperatures of deflection under load is too small, a temperature dependence of an appearance of a phase difference decreases. When the difference of the temperatures of deflection under load is too large, it becomes difficult to stretch a thermoplastic resin having a high softening temperature, and the planarity of a retardation film is easy to decrease.

Both of a rupture elongation of a thermoplastic resin A at a temperature $Ts_B$ and a rupture elongation of a thermoplastic resin B at a temperature $Ts_A$ are preferably 50% or more, and more preferably 80% or more.

A phase difference film may be stably prepared by stretching a thermoplastic resin having the rupture elongation in this range.

The rupture elongation is measured by use of a test piece type 1B described in Japanese Industrial Standard K7127 at a drawing speed of 100 mm/minute.

Compounding agents may be added to thermoplastic resin A and/or thermoplastic resin B, if a total light transmittance in 1 mm thickness may be maintained to 80% or more. The compounding agent is not especially limited. Examples of the compounding agent include lubricants; lamellar crystal compounds; inorganic particulates; stabilizers such as antioxidant, thermal stabilizers, optical stabilizers, weathering stabilizers, ultraviolet absorbers, near-infrared radiation absorbents, and the like; plasticizer; colorant such as dyes and pigments; antistatic agent; and the like. The amount of the compounding agent may be properly decided within a range where the object of the present invention is not ruined. In particular, lubricant or ultraviolet absorber is preferably added to improve a flexibility and a weather resistance.

Examples of the lubricant include inorganic particles such as silica dioxide, titanium dioxide, magnesium oxide, calcium carbonate, magnesium carbonate, barium sulphate, strontium sulphate and the like; organic particles such as polymethyl acrylate, polymethyl methacrylate, polyacrylonitrile, polystyrene, cellulose acetates, cellulose acetate propionates, and the like. In the present invention, the organic particle is preferable as the lubricant.

Examples of the ultraviolet absorber include oxybenzophenone compounds, benzotriazol compounds, salicylate compounds, benzophenone ultraviolet absorbents, benzotriazol ultraviolet absorbers, acrylonitrile ultraviolet absorbers, triazine compounds, nickel complex salt compounds, inorganic fine particle, and the like. Examples of a suitable ultraviolet absorber include 2,2'-Methylene-bis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazol, 2,4-Di-tert-butyl-6-(5-chlorobenzotriazol-2-yl)phenol, 2,2'-dihydroxy-4,4'-dimethoxybenzophenone, and 2,2',4,4'-tetrahydroxybenzophenone. And examples of the especially suitable one include 2,2'-Methylenebis(4-(1,1,3,3-tetramethylbutyl)-6-(2H-benzotriazol-2-yl)phenol.

(Laminated Film)

A laminated film comprises a layer of thermoplastic resin A (layer A) and a layer of thermoplastic resin B (layer B). The laminated film may be obtained by coextruding or simultaneously casting of thermoplastic resin A and thermoplastic resin B.

A coextrusion molding method is preferable from the viewpoint of producing efficiency and preventing from remaining volatile contents such as solvents in the film. A coextrusion T-die method is preferable in the extrusion molding method. There are a feed block method and a multi manifold method as the coextrusion T-die method, and the multi manifold method is especially preferable from the viewpoint of decreasing a dispersion of the thickness of layer A.

When the coextrusion T-die method is adopted as a method of obtaining the laminated film, a temperature of melted resin material in an extruding machine equipped with T-die is preferably a temperature that is higher than a glass transition temperature (Tg) of thermoplastic resin used as each resin material by 80 to 180° C., and more preferably a temperature that is higher than the glass transition temperature by 100 to 150° C. When the temperature of melted resin material in the extruding machine is excessive low, a liquidity of the resin material might be insufficient, oppositely when the temperature of melted resin material is excessive high, the resin might be deteriorated.

The temperature of extrusion may be properly selected according to the thermoplastic resin used. A temperature of a resin slot is preferably Tg to (Tg+100)° C., a temperature of an exit of the extruding machine is preferably (Tg+50)° C. to (Tg+170)° C., and a temperature of a die is preferably (Tg+50)° C. to (Tg+170)° C., in which these temperatures are measured in the extruding machine. Here, Tg means a glass transition temperature of a thermoplastic resin A used as a resin material.

In the extrusion molding method, a sheeted melted resin material extruded from an opening of the die is pinned on a cooling drum. A method of pinning a melted resin material on the cooling drum is not especially limited, and examples of the method include an air knife method, a vacuum box method, a electrostatic pinning method, and the like.

The number of cooling drums is usually two or more, though the number is not particularly limited. Moreover, examples of a method of arranging the cooling drums include a straight line type, a Z type, and a L type, though the method is not particularly limited. Moreover, the method of passing the melted resin extruded from the opening of the die between the cooling drums is not particularly limited.

In the present invention, the adhesion to the cooling drum of the extruded sheeted resin material changes depending on the temperature of the cooling drum. The adhesion improves when a temperature of the cooling drum is raised. However, trouble that the sheeted resin material coils around the drum without peeling off from the cooling drum might occur when the temperature of the cooling drum is raised too much. Therefore, the temperature of the cooling drum is preferably no more than (Tg+30)° C., and more preferably (Tg−5)° C. to (Tg−45)° C., in which Tg is a glass transition temperature of a thermoplastic resin A that extruded from the die. The trouble such as slipping and the wound may be prevented by doing so.

Moreover, it is preferable to reduce a content of a residual solvent in the film. Examples of the method for reducing the content include (1) a method of reducing residual solvent of thermoplastic resin as raw material; (2) a method of preliminary drying resin material before film is molded; and the like. The preliminary drying is done by using a hot air dryer and the like for example after the resin material is molded in the form such as pellets and the like. The dry temperature is preferable 100° C. or more, and the dry time is preferable two hours or more. By the preliminary drying, the residual solvent in the film may be decreased, and the extruded sheeted resin material may be prevented from foaming.

The total thickness of a laminated film for producing retardation film is preferably 10 to 500 μm, and more preferably 20 to 200 μm, and especially preferably 30 to 150 μm. When the above-mentioned total thickness is thinner than 10 μm, it becomes difficult to obtain an enough phase difference, and mechanical strength of the film weakens. When the above-mentioned total thickness is thicker than 500 μm, flexibility deteriorates and it becomes difficult to handle the film.

The thickness of layer A and layer B is determined by the steps of: measuring the total thickness of the film by using a contacting thickness gauge in the marketplace; cutting a part where thickness is measured; observing the cutting surface with a photon microscope to measure a ratio of a thickness of an each layers; and calculating the thickness of layer A and layer B from the ratio. The above-mentioned operations were done in the direction of MD and the direction of TD of the film at constant intervals, and a mean value of the thickness and the data spread of the thickness were decided.

Here, the data spread of thickness is calculated by the following expressions:

A data spread of a thickness (μm)=Large one of $T_{ave}-T_{min}$ or $T_{max}-T_{ave}$ in which $T_{max}$ represents the maximum value in measured thickness T, $T_{min}$ represents the minimum value in measured thickness T, and $T_{ave}$ represents an arithmetic mean value of thickness T measured by the above-mentioned measurements.

When the data spread of the thickness of layer A and layer B is 1 μm or less in the entire plane, the variability of a color tone becomes small. Moreover, a change of the color tone after long-term use becomes uniform.

The following steps are performed to adjust the data spread of the thickness of layer A and layer B to 1 μm or less in the entire plane: (1) a polymer filter having mesh spacing of 20 μm or less is attached in an extruding machine; (2) a gear pump is rotated by 5 rpm or more; (3) an enclosure means is attached to surroundings of a die; (4) an airgap is set to 200 mm or less; (5) an edge pinning is performed when a film is casted to a cooling roll; and (6) a two axis extruding machine or a single axis extruding machine which has a double flight type screw is used as the extruding machine.

The laminated film for producing the retardation film may have layers other than layer A and layer B. Examples of the layer include a bonding layer to bond layer A and layer B, a mat layer to improve slipperiness of the film, a hard coat layer such as an impact-resistant polymethacrylate resin layer and the like, an antireflection layer, an antifouling layer, and the like.

The laminated film for producing the retardation film is preferably 85% or more in a total light transmittance. When the total light transmittance is less than 85%, the film becomes unsuitable to an optical material. The above-mentioned light transmittance is measured by using a spectrophotometer (manufactured by JASCO Corporation; Ultraviolet Visible Near-infrared Spectrophotometer "V-570") in accordance with Japanese Industrial Standard K 0115.

A haze of the laminated film for producing the retardation film is preferably 5% or less, more preferably 3% or less, and especially preferably 1% or less. When the haze is high, a sharpness of a display image tends to decrease. Here, the haze is a mean value of turbidities measured at five places by using "Turbidimeter NDH-300A" (manufactured by Nippon Denshoku Industries Co., Ltd.) in accordance with Japanese Industrial Standard K 7361-1997.

The laminated film for producing the retardation film is preferably 5 or less, and more preferably 3 or less in ΔYI. When the ΔYI is in the above-mentioned range, a visibility improves since there is not coloring. ΔYI is measured by using "Spectrophotometer SE2000" (manufactured by the Nippon Denshoku Industries Co., Ltd.) in accordance with ASTM E313. The Similar measurement is done five times, and the ΔYI is obtained as an arithmetic mean value of the measurements.

The laminated film for producing the retardation film is preferably H or harder in the JIS pencil hardness. This JIS pencil hardness may be adjusted by changing a kind of a resin, changing the thickness of the resin layer, and the like. A surface of a film is scratched with a pencil having various hardness inclined to 45 degrees and pushed on by a load weight of 500 gram-weight, in accordance with JIS K 5600-5-4, sequentially from the pencil having low hardness, and the JIS pencil hardness means a hardness of the first pencil by which the scar is applied to the film.

A surface of an outside of the laminated film for producing the retardation film is preferably smooth and has preferably substantially neither a linear concave portion nor a linear convex portion (so-called die line) that is parallel in the direction of MD and is irregularly formed. Here, "be smooth and have substantially neither a linear concave portion nor a linear convex that is irregularly formed" means that a depth of the linear concave portion is less than 50 nm or a width of the linear concave portion is bigger than 500 nm and a height of the linear convex portion is less than 50 nm and a width of the linear convex portion is bigger than 500 nm, even if the linear concave portion or the linear convex portion is formed. Preferably, the depth of the linear concave portion is less than 30 nm or the width of the linear concave portion is bigger than 700 nm and the height of the linear convex portion is less than 30 nm and the width of the linear convex portion is bigger than 700 nm. This formation may prevent a light interference, an optical leakage and the like caused by the refraction of light at the linear concave portion and the linear convex portion, which may result in improving an optical performance. "be irregularly formed" means that the linear concave portion and the linear convex portion are formed at the unintended position, with the unintended size, the unintended shape, and the like.

The above-mentioned depth of the linear concave portion, the height of the linear convex portion, and the width of those may be measured by the method of the description as follows. Light is irradiated to the film for producing the retardation film, transmitted light is projected onto a screen, then a part where stripes of light and shade exist that appears on the screen (in this part, the depth of a linear concave portion and the height of a linear convex portion are big) is cut out in square of 30 mm×30 mm. A surface of the film section cut out is observed by using a three-dimensional surface structure analyzing microscope (view area of 5 mm×7 mm), this observation result is converted into a three dimension image, and then a cross-section profile is obtained from the three dimensional image. The cross-section profile is obtained at intervals of 1 mm in the view area.

An average line is drawn at this cross-section profile, then length from this average line to the bottom of a linear concave portion is taken as a depth of linear concave portion, moreover length from this average line to a top of the linear convex portion is taken as a height of a linear convex portion. The distance between intersections of the average line and the profile is taken as width. Each of the maximum value is obtained from measurements of depth of the linear concave portion and height of the linear convex portion. And each of the width of the linear concave portion or the linear convex portion that indicates the maximum value is obtained. The maximum value of the depth of the above-mentioned linear concave portion is taken as a depth of the linear concave portion of the film, and the maximum value of the height of the above-mentioned linear convex portion is taken as a height of the linear convex portion of the film, and the width of a linear concave portion that indicates the maximum value is taken as the width of a linear concave portion of the film, and the width of a linear convex portion that indicates the maximum value is taken as the width of a linear convex portion of the film.

A step of pre-heating the laminated film (preheating process) may be performed before the laminated film is stretched. Examples of a means for heating the laminated film include an oven type heating device, a radiation heating device, soaking the film in the liquid, and the like. The oven type heating device is especially preferable. A heating temperature in the preheating process is usually (the stretching temperature−40)° C. to (the stretching temperature+20)° C., and preferably (the stretching temperature−30)° C. to (the stretching temperature+15)° C. The stretching temperature means the preset temperature of the heating unit.

In a method for producing a retardation film {1} which satisfies a relation of $R_{450} < R_{550} < R_{650}$ in the present invention, in which $R_{450}$ is a retardation value of light having a wavelength of 450 nm at an incident angle of 0 degrees, $R_{550}$ is a retardation value of light having a wavelength of 550 nm at an incident angle of 0 degrees, and $R_{650}$ is a retardation value of light having a wavelength of 650 nm at an incident angle of 0 degrees; it is preferable to use a resin having a positive or negative intrinsic birefringence as the thermoplastic resin A, and to use a resin having an intrinsic birefringence of same sign as a sign of thermoplastic resin A as thermoplastic resin B. Each of a layer composed of the thermoplastic resin A and a layer composed of the thermoplastic resin B may have one layer or no less than two layers.

In the method for manufacture of the retardation film {1}, one of the thermoplastic resin A and the thermoplastic resin B is preferably 40 or more in Abbe number, and the another is preferably 30 or less in Abbe number. Here, Abbe number is a level of easiness to appear a difference of the refractive index (variance) by the difference of the wavelength of light, and it is shown by the following expression.

$$v_D = (n_D - 1)/(n_F - n_C)$$

in which $v_D$ is Abbe number, $n_C$, $n_D$, and $n_F$ are refractive indexes at C-ray (wavelength of 656 nm), D-ray (wave length of 589 nm) and F-ray (wavelength of 486 nm).

The laminated film for producing the retardation film {1} preferably has a characteristic that a phase of linearly polarized light entering vertically into the film plane and having an oscillating surface of an electric vector in an X-Z plane against a phase of linearly polarized light entering vertically into the film plane and having an oscillating surface of an electric vector in a Y-Z plane either lags or leads by uniaxially stretching in the direction of the X axis at any of stretching temperatures T1 and T2, in which the X axis is an uniaxially stretching direction, the Y axis is a direction perpendicular to the uniaxially stretching direction in the film plane, and the Z axis is a direction of a thickness of the film.

The thickness of both resin layers of the laminated film for producing the retardation film {1} are preferably adjusted so as to be an absolute value of a phase difference which appears in a resin having a high deflection temperature under load smaller than the absolute value of the phase difference which appears in a resin having a low deflection temperature under load by stretching at low temperature $T_L$, and so as to be an absolute value of a phase difference which appears in the resin having the low deflection temperature under load smaller than an absolute value of a phase difference which appears in the resin having the high deflection temperature under load by stretching at high temperature $T_H$. The laminated film for producing the retardation film {1} is a film of which the resin layer that the larger phase difference appears depends on the stretching temperature. Here, a temperature T1 is a temperature either $T_H$ or $T_L$, and a temperature T2 is a temperature either $T_H$ or $T_L$ different from T1.

In a method for producing a retardation film {2} in the present invention, in which the retardation film satisfies a relation of $0 < (n_x - n_z)/(n_x - n_y) < 1$, $n_x$ is a refractive index in a direction of a slow axis in a plane of the film, $n_y$ is a refractive index in a direction perpendicular to the direction of the slow axis in the plane, and $n_z$ is a refractive index in a thickness direction, it is preferable to use a thermoplastic resin having a positive or negative intrinsic birefringence as thermoplastic resin A, and it is preferable to use a thermoplastic resin having a intrinsic birefringence of a different sign from a sign of the intrinsic birefringence of the thermoplastic resin A as thermoplastic resin B. Each of a layer of the thermoplastic resin A and a layer of the thermoplastic resin B may have one layer or more than two layers.

The laminated film for producing the retardation film {2} preferably has a characteristic that a phase of linearly polarized light entering vertically into the film plane and having an oscillating surface of an electric vector in an X-Z plane against a phase of linearly polarized light entering vertically into the film plane and having an oscillating surface of an electric vector in a Y-Z plane lags by uniaxially stretching in the direction of the X axis at temperature T1, and leads by uniaxially stretching in the direction of the X axis at temperature T2 different from temperature T1, in which the X axis is an uniaxially stretching direction, the Y axis is a direction perpendicular to the uniaxially stretching direction in the film plane, and the Z axis is a direction of a thickness of the film.

In a film having a characteristic that a slow axis appears in the X axis by uniaxially stretching, a phase of linearly polarized light having an oscillating surface of an electric vector in an X-Z plane lags against a phase of linearly polarized light having an oscillating surface of an electric vector in a Y-Z plane. Oppositely, in a film having a characteristic that a fast axis appears in the X axis by the uniaxially stretching, a phase of linearly polarized light having an oscillating surface of an electric vector in an X-Z plane leads against a phase of linearly polarized light having an oscillating surface of an electric vector in a Y-Z plane. The laminated film for producing the retardation film {2} is a film which has a dependence of the direction where the slow axis or the fast axis appears on a stretching temperature.

A phase difference is a value obtained by multiplying a thickness d by a difference ($=n_x-n_y$) between a refractive index $n_x$ in a direction of an X axis that is a stretching direction and a refractive index $n_y$ in a direction of a Y axis perpendicular to the stretching direction. A phase difference of a laminated body of layer A and layer B is the sum of a phase difference of layer A and a phase difference of layer B. In order that an sign of a phase difference of the laminated body composed of layer A and layer B may reverse by stretching at a high temperature $T_H$ and a low temperature $T_L$, it is preferable to adjust the thickness of both resin layers so as to be an absolute value of a phase difference which appears in a resin having a high deflection temperature under load smaller than an absolute value of the phase difference which appears in a resin having a low deflection temperature under load by stretching at low temperature $T_L$, and so as to be an absolute value of a phase difference which appears in the resin having the low deflection temperature under load smaller than an absolute value of the phase difference which appears in the resin having the high deflection temperature under load by stretching at high temperature $T_H$. In this way, a film which has a characteristic that a phase of which linearly polarized light entering vertically into a film plane and having an oscillating surface of an electric vector in an X-Z plane against a phase of linearly polarized light entering vertically into the film plane and having an oscillating surface of an electric vector in a Y-Z plane lags by uniaxially stretching in a direction of the X axis at a temperature T1, and leads by uniaxially stretching in the direction of the X axis at a temperature T2 different from the above-mentioned temperature T1 can be obtained by adjustments of a difference between refractive index $n_x$ in a direction of the X axis and refractive index $n_y$ in a direction of the Y axis which appears in each of layer A and layer B by uniaxially stretching, the sum total thickness of layer (s) A, and the sum total thickness of layer (s) B. Here, a temperature T1 is a temperature either $T_H$ or $T_L$, and a temperature T2 is a temperature either $T_H$ or $T_L$ different from T1.

FIG. 1 shows a temperature dependence of phase difference of layer A in the laminated film for producing the retardation film {2} (a layer of a thermoplastic resin A having a high deflection temperature under load) when layer A is stretched, a temperature dependence of phase difference of layer B in the laminated film for producing the retardation film {2} (a layer of a thermoplastic resin B having a low deflection temperature under load) when layer B is stretched, and a temperature dependence of phase difference of the laminated film for producing the retardation film {2} (layer A+layer B) when the film is stretched. By stretching at the temperature Tb, since a phase difference of a minus that appears in the layer B is bigger than a phase difference of a plus that appears in the layer A, a phase difference of a minus Δ appears in the layer A+layer B. On the other hand, by stretching at the temperature Ta, since a phase difference of a minus that appears in the layer B is smaller than a phase difference of a plus that appears in the layer A, a phase difference of a plus Δ appears in the layer A+layer B.

For example, when layer A is a polycarbonate resin, and layer B is a styrene-maleic anhydride copolymer, a ratio of the sum total thickness of layer A and the sum total thickness of layer B is preferably 1:5 to 1:15, and more preferably 1:5 to 1:10. If layer A becomes thick too much or layer B becomes thick too much, a temperature dependence of a appearance of a phase difference decreases.

(Stretching Processing)

In the present invention, next, the above-mentioned laminated film for producing the retardation film is uniaxially stretched at least twice. The stretching temperature is preferably adjusted in a different temperature at each time. Moreover, the stretching direction is adjusted in a different direction at each time. And, the molecular orientation axis in the layer of thermoplastic resin A and the molecular orientation axis in the layer of thermoplastic resin B are crossed at almost right angles.

In the first round of uniaxially stretching, the film is uniaxially stretched at either temperature T1 or T2. In the laminated film for producing the retardation film {1}, a phase of linearly polarized light entering vertically into the film plane and having an oscillating surface of an electric vector in an X-Z plane against a phase of linearly polarized light entering vertically into the film plane and having an oscillating surface of an electric vector in a Y-Z plane either lags or leads by stretching at any temperature. In the laminated film for producing the retardation film {2}, a phase of linearly polarized light entering vertically into the film plane and having an oscillating surface of an electric vector in an X-Z plane against a phase of linearly polarized light entering vertically into the film plane and having an oscillating surface of an electric vector in a Y-Z plane lags by stretching at temperature T1. On the other hand, the phase of linearly polarized light entering vertically into the film plane and having an oscillating surface of an electric vector in an X-Z plane against a phase of linearly polarized light entering vertically into the film plane and having an oscillating surface of an electric vector in a Y-Z plane leads by stretching at temperature T2.

In case a resin having a positive intrinsic birefringence is used as thermoplastic resin A, and a resin having a negative intrinsic birefringence is used as thermoplastic resin B, when a relation of $Ts_A > Ts_B$ is satisfied, the temperature T1 is preferably $Ts_B + 3°$ C. or more and $Ts_A + 5°$ C. or less, and more preferably $Ts_B + 5°$ C. or more and $Ts_A + 3°$ C. or less. Moreover, the temperature T2 is preferably $Ts_B + 3°$ C. or less, and more preferably $Ts_B$ or less. In the first round of uniaxially stretching, the film is preferably uniaxially stretched at temperature T1, when a relation of $Ts_B > Ts_A$ is satisfied, the temperature T2 is preferably $Ts_A + 3°$ C. or more and $Ts_B + 5°$ C. or less, and more preferably $Ts_A + 5°$ C. or more and $Ts_B + 3°$ C. or less. Moreover, the temperature T1 is preferably $Ts_A + 3°$ C. or less, and more preferably $Ts_A$ or less. In the first round of uniaxially stretching, the film is preferably uniaxially stretched at temperature T2.

The first round of uniaxially stretching may be performed by a conventionally well-known method. For examples, a method of uniaxially stretching in the longitudinal direction by using the difference of the rim speed between rolls, a method of uniaxially stretching in the transverse direction by using the tenter, and the like are mentioned. Examples of the method of uniaxially stretching in the longitudinal direction include an IR heating method between rolls, a float method, and the like. The float method is suitable from the viewpoint of obtaining a retardation film with high optical uniformity. Examples of the method of uniaxially stretching in the transverse direction include a tenter method.

To reduce an irregular stretching and irregular thickness, it is allowable to make a difference of a temperature in a direction of a width of the film at a stretching zone. To make the difference of the temperature in the direction of the width of the film at the stretching zone, well-known methods such as a method of adjusting a gate opening of hot air nozzle in direction of width, a method of setting IR heaters in direction of width and controlling heating, and the like may be used.

Then, the film is uniaxially stretched in an direction perpendicular to the direction of the above-mentioned uniaxially stretching at a different temperature either T2 or T1 from the temperature of the first round of uniaxially stretching. In the second round of uniaxially stretching, when a relation of $Ts_A > Ts_B$ is satisfied, the film is preferably uniaxially stretched at the temperature T2, and when a relation of $Ts_B > Ts_A$ is satisfied, the film is preferably uniaxially stretched at the temperature T1.

In the second round of uniaxially stretching, the methods that may be employed in the first round of uniaxially stretching may be employed as it is. A stretching ratio in the second round of uniaxially stretching is preferably smaller than the stretching ratio in the first round of uniaxially stretching.

Directions of a molecular orientation axis in the layer of thermoplastic resin A and a molecular orientation axis in the layer of thermoplastic resin B can be identified as follows. The direction where the refractive index is a maximum in the plane of the retardation film is determined by using an ellipsometry. Then the orientation axis is appointed from a relation of a sign of the intrinsic birefringence value of the thermoplastic resin according to the following conditions.

When the intrinsic birefringence of the thermoplastic resin is positive: the orientation axis has a direction where the refractive index is a maximum in the plane.

When the intrinsic birefringence of the thermoplastic resin is negative: the orientation axis has a direction orthogonal to the direction where the refractive index is a maximum in the plane.

After the first round of uniaxially stretching and/or the second round of uniaxially stretching, a fixation process may be applied to the stretched film. A temperature in the fixation process is usually room temperature to (the stretching temperature+30)° C., and preferably (the stretching temperature−40)° C. to (the stretching temperature+20)° C.

In a method for producing a retardation film in the present invention, when the laminated film for producing the retardation film {1} is used, the retardation film {1} which satisfies a relation of $R_{450} < R_{550} < R_{650}$, in which $R_{450}$ is a retardation value of light having a wavelength of 450 nm at an incident angle of 0 degrees, $R_{550}$ is a retardation value of light having a wavelength of 550 nm at an incident angle of 0 degrees, and $R_{650}$ is a retardation value of light having a wavelength of 650 nm at an incident angle of 0 degrees, can be obtained. Moreover, when the laminated film for producing the retardation film {2} is used, the retardation film {2} which satisfies a relation of $0 < (n_x - n_z)/(n_x - n_y) < 1$, in which $n_x$ is a refractive index in a direction of a slow axis in a plane of the film, $n_y$ is a refractive index in a direction perpendicular to the direction of the slow axis in the plane, and $n_z$ is a refractive index in a thickness direction, can be obtained.

The retardation film obtained by the producing method in the present invention is preferably 50 to 400 nm, and more preferably 100 to 350 nm in a retardation $R_{550}$ at a wavelength of 550 nm. The retardation $R_{450}$, $R_{550}$, and $R_{650}$ are values measured by using the parallel Nicols rotation method (manufactured by Oji Scientific Instruments Co., Ltd.; KOBRA-WR). The refractive index $n_x$, $n_z$, and $n_y$ are values measured with an ellipsometry at a wavelength of 550 nm.

The retardation film obtained by the producing method in the present invention is preferably 0.5% or less, more preferably 0.3% or less in a shrinkage percentage in a longitudinal and transverse direction after heat-treating for 100 hours at 60° C. and 90% RH. When the shrinkage percentage exceeds this range, a transformation of the retardation film and flaking off from the display device are caused by the shrinkage stress by using under the environment of the high temperature and high humidity.

Since the retardation film obtained by the producing method in the present invention is capable of advanced birefringence compensations, the retardation film may be employed as single or in combination with other members in a liquid crystal display device, an organic EL display device, a plasma display device, a FED (field emission) display device, a SED (surface electric field) display device, and the like.

The liquid crystal display device comprises the liquid crystal panel that a polarizing plate on an incident side of light, a liquid crystal cell, and a polarizing plate on an output side of light are arranged in this order. A visibility of the liquid crystal display device can be improved greatly by arranging the retardation film obtained by the producing method in the present invention between the liquid crystal cell and the polarizing plate on the light incident side and/or between the liquid crystal cell and the polarizing plate on the light output side. The drive mode for the liquid crystal cell includes In Plane Switching (IPS) mode, Virtical Alignment (VA) mode, Multi domain Virtical Alignment (MVA) mode, Continuous Pinwheel Alignment (CPA) mode, Hybrid Alignment Nematic (HAN) mode, Twisted Nematic (TN)

mode, Super Twisted Nematic (STN) mode, Optical Compensated Bend (OCB) mode and the like.

The retardation film obtained by the producing method in the present invention may be stuck to the liquid crystal cell or the polarizing plate. The retardation film may be stuck to both sides of the polarizing plate or to one side of the polarizing plate. Moreover, two or more sheets of the retardation film may be used. A well-known adhesive may be used for sticking.

The polarizing plate is composed of a polarizer and protective films stuck to the both sides of the polarizer. The retardation film may be used as a protective film by sticking the retardation film obtained by the producing method in the present invention directly to the polarizer in place of the protective film. Since the protective film is omitted, the liquid crystal display device can be thinned.

EXAMPLES

The present invention will be described more specifically with reference to EXAMPLES in the following. However, the present invention is not limited to the examples. In the following EXAMPLES, "parts" or "%" is by weight unless otherwise specified.

(Measurement of Orientation Axis)

A direction where the refractive index is the maximum in a plane was determined by using a high-speed spectroscopic ellipsometry (manufactured by J. A. Woollam Co., Inc. "M-2000U"). An orientation axis was appointed by a relationship between the direction and a sign of an intrinsic birefringence indicated in the following.

When the intrinsic birefringence is positive: The orientation axis is a direction where the refractive index is the maximum in the plane.

When the intrinsic birefringence is negative: The orientation axis is a direction orthogonal to the direction where the refractive index is the maximum in the plane.

The measurement was performed under the condition of relative humidity 60±5%, temperature 20° C.±2° C. The refractive index that is the maximum in the plane was a value at wavelength 550 nm from the data calculated by the spectrum of the wavelength area from 400 to 1000 nm in three incident angles of 55 degrees, 60 degrees, and 65 degrees.

(Thickness of Transparent Film)

A film was embedded into an epoxy resin, the film was sliced into pieces using a microtome (manufactured by YAMATO KOHKI INDUSTRIAL Co., Ltd.; "RUB-2100"), and then the cross-section of the piece was observed using a scanning electron microscope to determine a film thickness.

(Refractive Index)

The measurement was performed by using a spectroscopic ellipsometry (manufactured by J. A. Woollam Co., Inc. "M-2000U") under the condition of the relative humidity 60±5% and temperature 20° C.±2° C. Refractive index $n_x$, $n_z$, and $n_y$ were values at a wavelength of 550 nm determined from the data calculated by the spectrum in wavelength from 400 to 1000 nm at three incident angles of 55 degrees, 60 degrees, and 65 degrees.

(Light Transmittance)

A light transmittance was measured by using a spectrophotometer (manufactured by JASCO Corporation; Ultraviolet Visible Near-infrared Spectrophotometer "V-570") in accordance with JIS K 0115.

(Deflection Temperature under Load)

The test piece was made in accordance with JIS K 6717-2, and the deflection temperature under load of the resin was measured.

(Retardation, Angle of Slow Axis)

Retardation in each wavelength and an angle of the slow axis to a longitudinal direction of a retardation film were measured by using the parallel Nicols rotation method (manufactured by Oji Scientific Instruments Co., Ltd.; KOBRA-WR) in the width direction of the retardation film at equal intervals by ten points, and the mean value was calculated.

(Abbe Number)

Abbe number was measured by using the Abbe Refractometer (manufactured by ATAGO CO., LTD; DR-M2) under a condition of the relative humidity 60±5% and temperature 20° C.±2° C.

Producing Example 1

A film molding device for coextrusion molding of two kinds and three layers was prepared. Then, pellets of a polycarbonate resin (manufactured by Asahi Chemical Industrial Co., Ltd., WONDER LIGHT PC-110, a deflection temperature under load is 145° C., a intrinsic birefringence is positive, and Abbe number is 30) were put in a first uniaxially extruding machine which was equipped with a screw of the double flight type, and were melted. Pellets of a norbornene-based polymer resin (manufactured by ZEON CORPORATION, ZEONOR 1420R, a deflection temperature under load is 136° C., a intrinsic birefringence is positive, and Abbe number is 56) were put in a second uniaxially extruding machine which was equipped with a screw of the double flight type, and were melted.

Styrene-ethylene-butylene-styrene block copolymer (SEBS) was put in a third uniaxially extruding machine which was equipped with a screw of the double flight type, and was melted. The polycarbonate resin melted at 260° C. was supplied to one manifold of a multi manifold die (surface roughness of the die lip Ra is 0.1 μm) through a leaf disk shaped polymer filter having a mesh spacing of 10 μm, the norbornene-based polymer resin melted at 260° C. was supplied to the other manifold through a leaf disk shaped polymer filter having a mesh spacing of 10 μm. Moreover, the SEBS melted at 260° C. was supplied to a manifold for the adhesive layer through a leaf disk shaped polymer filter having a mesh spacing of 10 μm.

The polycarbonate resin, the norbornene-based polymer resin, and the SEBS were extruded from the multi manifold die at the same time at 260° C. to be made into a melted resin film. The melted resin film was casted on a cooling roll modulated at 130° C. in the surface temperature, and was passed between two cooling rolls that was modulated at 50° C. in the surface temperature to obtain a laminated film 1 being 1350 mm in width and 185 μm in thickness composed of the polycarbonate resin layer (layer A: 20 μm), the SEBS layer (5 μm) and the norbornene-based polymer resin layer (layer B: 160 μm).

Example 1

The laminated film 1 obtained in PRODUCING EXAMPLE 1 was supplied to a longitudinal uniaxially stretching machine, and the film was stretched in a longitudinal direction at the stretching temperature of 145° C. by stretching magnification of 1.5 times. Then, the stretched film was supplied to the tenter stretching machine, the film was stretched in a transverse direction at the stretching temperature of 125° C. by stretching magnification of 1.25 times to obtain a retardation film 1. A refractive index of layer A in the retardation film 1 was measured by the ellipsometry, then it was identified that an orientation axis of layer A was existed in almost parallel to the longitudinal direction of the film. In the same way, a refractive index of layer B in the retardation film 1 was measured by the ellipsometry, then it was identified that an orientation axis of layer B was existed at almost orthogonal to the longitudinal direction of the film. The retardation film 1 had a relation of $R_{450}<R_{550}<R_{550}$. The evaluation results are shown in Table 1.

Comparative Example 1

A retardation film 2 was obtained in the same manner as in EXAMPLE 1, except that the transverse direction stretching temperature was changed to 145° C. A refractive index of layer A of the retardation film 2 was measured by the ellipsometry, then it was identified that an orientation axis of layer A was existed in almost parallel to the longitudinal direction of the film. In the same way, a refractive index of layer B of the retardation film 2 was measured by the ellipsometry, then it was identified that an orientation axis of layer B was existed in almost parallel to the longitudinal direction of the film. The retardation film 2 had a relation of $R_{450}>R_{550}>R_{650}$. The evaluation results are shown in Table 1.

TABLE 1

|  | Example 1 | Comparative Example 1 |
| --- | --- | --- |
| Laminated film | 1 | 1 |
| Longitudinal stretching temperature (° C.) | 145 | 145 |
| Longitudinal stretching magnification | 1.5 | 1.5 |
| Transverse stretching temperature (° C.) | 130 | 145 |
| Transverse stretching magnification | 1.25 | 1.25 |
| Retardation film | 1 | 2 |
| $n_x$ | 1.5368 | 1.5367 |
| $n_y$ | 1.5360 | 1.5355 |
| $n_z$ | 1.5335 | 1.5341 |
| $R_{450}$ | 75.0 | 117.9 |
| $R_{500}$ | 76.9 | 113.9 |
| $R_{650}$ | 78.2 | 111.0 |

As shown in Table 1, a thermoplastic resin A and a thermoplastic resin B of which both have an same sign in an intrinsic birefringence are co-extruded or simultaneously casted to obtain a laminated film comprising a layer of the thermoplastic resin A and a layer of the thermoplastic resin B, and the laminated film is uniaxially stretched at least twice to cross a molecular orientation axis in the layer of thermoplastic resin A and a molecular orientation axis in the layer of thermoplastic resin B each other at almost right angles, which result in producing a retardation film which satisfies a relation of $R_{450}<R_{550}<R_{650}$, in which $R_{450}$ is a retardation value of light having a wavelength of 450 nm at an incident angle of 0 degrees, $R_{550}$ is a retardation value of light having a wavelength of 550 nm at an incident angle of 0 degrees, and $R_{650}$ is a retardation value of light having a wavelength of 650 nm at an incident angle of 0 degrees, simply, extensively and accurately.

Producing Example 2

A film molding device for a coextrusion molding of two kinds and two layers was prepared. Then, pellets of the polycarbonate resin (Made by Asahi Chemical Industrial Co., Ltd., WONDER LIGHT PC-110, a deflection temperature under load is 145° C.) were put in one uniaxially extruding machine which was equipped with a screw of the double flight type, and were melted. Pellets of the styrene—maleic anhydride copolymer resin (made by NOVA Chemicals Ltd., Dylark D332, a deflection temperature under load is 135° C., a intrinsic birefringence is negative, and Abbe number is 31) was put in another uniaxially extruding machine which was equipped with a screw of the double flight type, and were melted. The polycarbonate resin melted at 260° C. was supplied to one manifold of a multi manifold die (surface-roughness of the die lip Ra is 0.1 μm) through a polymer filter having a leaf disk shape and a mesh spacing of 10 μm, and the styrene-maleic anhydride copolymer resin melted at 260° C. was supplied to another manifold through a polymer filter having a leaf disk shape and a mesh spacing of 10 μm.

The polycarbonate resin and the styrene maleic anhydride copolymer resin were extruded from the multi manifold die at the same time at 260° C. and were made into a melted resin film. The melted resin film was casted on a cooling roll modulated at 130° C. in the surface temperature, and was passed between two cooling rolls that was modulated at 50° C. in the surface temperature to obtain a laminated film 2 being 1350 mm in width and 180 μm in thickness composed of the polycarbonate resin layer (layer A: 20 μm) and the styrene—maleic anhydride copolymer resin layer (layer B: 160 μm)

Producing Example 3

A laminated film 3 being 1350 mm in width and 160 μm in thickness composed of the polycarbonate resin layer (layer A: 80 μm) and the polystyrene resin layer (layer B: 80 μm) was obtained in the same manner as in PRODUCING EXAMPLE 2, except that polystyrene resin (manufactured by Japan Polystyrene Inc., HF44, the deflection temperature under load is 73° C., a intrinsic birefringence is negative, and Abbe number is 31) was used in place of Dylark D332, the thickness of layer A was adjusted to 80 μm and the thickness of layer B was adjusted to 80 μm.

Example 2

A retardation film 3 was obtained in the same manner as in EXAMPLE 1, except that the laminated film 1 used in EXAMPLE 1 was changed to the laminated film 2. A refractive index of layer A in the retardation film 3 was measured by the ellipsometry, then it was identified that an orientation axis of layer A was existed in almost parallel to the longitudinal direction of the film. In the same way, a refractive index of layer B in the retardation film 3 was measured by the ellipsometry, then it was identified that an orientation axis of layer B was existed at almost orthogonal to the longitudinal direction of the film. The retardation film 3 was 0.6849 in $(n_x-n_z)/(n_x-n_y)$. The evaluation results are shown in Table 2.

Comparative Example 2

A retardation film 4 was obtained in the same manner as in EXAMPLE 1, except that the laminated film 1 used in EXAMPLE 1 was changed to the laminated film 3, and the transverse stretching temperature was changed to 70° C. A refractive index of layer A in the retardation film 4 was measured by the ellipsometry, then it was identified that an orientation axis of layer A was existed at almost orthogonal to the longitudinal direction of the film. In the same way, a refractive index of layer B in retardation film 4 was measured by the ellipsometry, then it was identified that an orientation axis of layer B was existed at almost orthogonal to the longitudinal direction of the film. The retardation film 4 was 2.3815 in $(n_x-n_z)/(n_x-n_y)$. The evaluation results are shown in Table 2.

TABLE 2

|  | Example 2 | Comparative Example 2 |
|---|---|---|
| Laminated film | 2 | 3 |
| Longitudinal stretching temperature (° C.) | 145 | 145 |
| Longitudinal stretching magnification | 1.5 | 1.5 |
| Horizontal stretching temperature (° C.) | 130 | 70 |
| Horizontal stretching magnification | 1.25 | 1.25 |
| Retardation film | 3 | 4 |
| $n_x$ | 1.5829 | 1.5892 |
| $n_y$ | 1.5803 | 1.5855 |
| $n_z$ | 1.5811 | 1.5804 |
| $(n_x - n_y)/(n_x - n_y)$ | 0.6849 | 2.3815 |
| $R_{450}$ | 269.7 | 367.6 |
| $R_{500}$ | 255.8 | 354.3 |
| $R_{650}$ | 245.5 | 344.4 |

As shown in Table 2, a thermoplastic resin A and a thermoplastic resin B which have a different sign of an intrinsic birefringence are co-extruded or simultaneously casted to obtain a laminated film comprising a layer of the thermoplastic resin A and a layer of the thermoplastic resin B, and the laminated film is uniaxially stretched at least twice to cross a molecular orientation axis in the layer of the thermoplastic resin A and a molecular orientation axis in the layer of the thermoplastic resin B each other at almost right angles, which result in producing a retardation film which satisfies a relation of $0<(n_x-n_z)/(n_x-n_y)<1$, in which $n_x$ is a refractive index in a direction of a slow axis in a plane of the film, $n_y$ is a refractive index in a direction perpendicular to the direction of the slow axis in the plane, and $n_z$ is a refractive index in a thickness direction, simply, extensively and accurately.

What is claimed is:

1. A method for producing a retardation film, comprising steps of: co-extruding or simultaneously casting a thermoplastic resin A and a thermoplastic resin B to obtain a laminated film comprising a layer of the thermoplastic resin A and a layer of the thermoplastic resin B,
wherein the thermoplastic resin A has a positive or negative intrinsic birefringence, the thermoplastic resin B has an intrinsic birefringence of the same sign as a sign of the thermoplastic resin A,
optimizing the thickness of the thermoplastic resin layer A and the thermoplastic resin layer B, wherein the optimizing includes determining if a first condition and a second condition are true or false, and adjusting the thickness of at least one of the thermoplastic layer A and the thermoplastic layer B if either of the first and second conditions are false,
wherein the first condition is that an absolute value of a phase difference which appears in the layer of the thermoplastic resin A is smaller than an absolute value of a phase difference which appears in the layer of the thermoplastic resin B when the laminated film is stretched at a temperature of $T_L$, and the second condition is that an absolute value of a phase difference which appears in the layer of the thermoplastic resin B is smaller than an absolute value of a phase difference which appears in the layer of the thermoplastic resin A when the laminated film is stretched at a temperature of $T_H$, wherein $Ts_A$ is a deflection temperature under load of the thermoplastic resin A, $Ts_B$ is a deflection temperature under load of the thermoplastic resin B and $Ts_A$ is higher than $Ts_B$;
first uniaxially stretching the laminated film at a temperature of T1 to obtain an uniaxially stretched film having an absolute value of a phase difference in the layer of the thermoplastic resin B smaller than an absolute value of a phase difference in the layer of the thermoplastic resin A, wherein T1 is $T_H$; then
second uniaxially stretching the uniaxially stretched film at a temperature of T2 to obtain a biaxially stretched film having an angle between a molecular orientation axis in the layer of the thermoplastic resin A and a molecular orientation axis in the layer of the thermoplastic resin B of 70 degrees to 110 degrees, wherein T2 is $T_L$ and $T_H$ is higher than $T_L$.

2. The method according to claim 1, wherein an absolute value of difference between the deflection temperature under load $Ts_A$ of the thermoplastic resin A and the deflection temperature under load $Ts_B$ of the thermoplastic resin B is 5° C. or more.

3. The method according to claim 1, wherein a rupture elongation of the thermoplastic resin A at a temperature of $Ts_B$ is 50% or more and a rupture elongation of the thermoplastic resin B at a temperature of $Ts_A$ is 50% or more.

4. The method according to claim 1, wherein the thermoplastic resin A is 40 or more in Abbe number, and the thermoplastic resin B is 30 or less in Abbe number.

5. The method according to claim 1, wherein the thermoplastic resin B is 40 or more in Abbe number, and the thermoplastic resin A is 30 or less in Abbe number.

6. The method according to claim 1, wherein a stretching ratio in the second uniaxially stretching is smaller than a stretching ratio in the first uniaxially stretching.

7. A retardation film which is obtained by the method according to claim 1.

8. The retardation film according to claim 7, the retardation film satisfying a relation of $R_{450}<R_{550}<R_{650}$, wherein $R_{450}$ is a retardation value of light having a wavelength of 450 nm at an incident angle of 0 degrees, $R_{550}$ is a retardation value of light having a wavelength of 550 nm at an incident angle of 0 degrees, and $R_{650}$ is a retardation value of light having a wavelength of 650 nm at an incident angle of 0 degrees.

9. A method for producing a retardation film, comprising steps of: co-extruding or simultaneously casting a thermoplastic resin A and a thermoplastic resin B to obtain a laminated film comprising a layer of the thermoplastic resin A and a layer of the thermoplastic resin B,
wherein the thermoplastic resin A has a positive or negative intrinsic birefringence, the thermoplastic resin B has an intrinsic birefringence of the same sign as a sign of the thermoplastic resin A, optimizing the thickness of the thermoplastic resin layer A and the thermoplastic resin layer B, wherein the optimizing includes determining if a first condition and a second condition are true or false, and adjusting the thickness of at least one of the thermoplastic layer A and the thermoplastic layer B if either of the first and second conditions are false, wherein the first condition is that an absolute value of a phase difference which appears in the layer of the thermoplastic resin A is smaller than an absolute value of a phase difference which appears in the layer of the thermoplastic resin B when the laminated film is stretched at a temperature of $T_L$, and the second condition is that an absolute value of a phase difference which appears in the layer of the thermoplastic resin B is smaller than an absolute value of a phase difference which appears in the layer of the thermoplastic resin A when the laminated film is stretched at a temperature of $T_H$, wherein $Ts_A$ is a deflection temperature under load of the thermoplastic resin A, $Ts_B$ is a deflection temperature under load of the thermoplastic resin B and $Ts_A$ is higher than $Ts_B$;

first uniaxially stretching the laminated film at a temperature of T1 to obtain an uniaxially stretched film having an absolute value of a phase difference in the layer of the thermoplastic resin A smaller than an absolute value of a phase difference in the layer of the thermoplastic resin B, wherein T1 is $T_L$; then second uniaxially stretching the uniaxially stretched film at a temperature of T2 to obtain a biaxially stretched film having an angle between a molecular orientation axis in the layer of the thermoplastic resin A and a molecular orientation axis in the layer of the thermoplastic resin B of 70 degrees to 110 degrees, wherein T2 is $T_H$ and $T_H$ is higher than $T_L$.

10. The method according to claim 9, wherein an absolute value of difference between the deflection temperature under load $Ts_A$ of the thermoplastic resin A and the deflection temperature under load $Ts_B$ of the thermoplastic resin B is 5° C. or more.

11. The method according to claim 9, wherein a rupture elongation of the thermoplastic resin A at a temperature of $Ts_B$ is 50% or more and a rupture elongation of the thermoplastic resin B at a temperature of $Ts_A$ is 50% or more.

12. The method according to claim 9, wherein the thermoplastic resin A is 40 or more in Abbe number, and the thermoplastic resin B is 30 or less in Abbe number.

13. The method according to claim 9, wherein the thermoplastic resin B is 40 or more in Abbe number, and the thermoplastic resin A is 30 or less in Abbe number.

14. The method according to claim 9, wherein a stretching ratio in the second uniaxially stretching is smaller than a stretching ratio in the first uniaxially stretching.

15. A retardation film which is obtained by the method according to claim 9.

16. The retardation film according to claim 15, the retardation film satisfying a relation of $R_{450}<R_{550}<R_{650}$, wherein $R_{450}$ is a retardation value of light having a wavelength of 450 nm at an incident angle of 0 degrees, $R_{550}$ is a retardation value of light having a wavelength of 550 nm at an incident angle of 0 degrees, and $R_{650}$ is a retardation value of light having a wavelength of 650 nm at an incident angle of 0 degrees.

17. A method for producing a retardation film, comprising steps of: co-extruding or simultaneously casting a thermoplastic resin A and a thermoplastic resin B to obtain a laminated film comprising a layer of the thermoplastic resin A and a layer of the thermoplastic resin B, wherein the thermoplastic resin A has a positive or negative intrinsic birefringence, the thermoplastic resin B has an intrinsic birefringence of the same sign as a sign of the thermoplastic resin A, optimizing the thickness of the thermoplastic resin layer A and the thermoplastic resin layer B, wherein the optimizing includes determining if a first condition and a second condition are true or false, and adjusting the thickness of at least one of the thermoplastic layer A and the thermoplastic layer B if either of the first and second conditions are false, wherein the first condition is that an absolute value of a phase difference which appears in the layer of the thermoplastic resin B is smaller than an absolute value of a phase difference which appears in the layer of the thermoplastic resin A when the laminated film is stretched at a temperature of $T_L$, and the second condition is that an absolute value of a phase difference which appears in the layer of the thermoplastic resin A is smaller than an absolute value of a phase difference which appears in the layer of the thermoplastic resin B when the laminated film is stretched at a temperature of $T_H$, wherein $Ts_A$ is a deflection temperature under load of the thermoplastic resin A, $Ts_B$ is a deflection temperature under load of the thermoplastic resin B and $Ts_B$ is higher than $Ts_A$;

first uniaxially stretching the laminated film at a temperature of T1 to obtain an uniaxially stretched film having an absolute value of a phase difference in the layer of the thermoplastic resin B smaller than an absolute value of a phase difference in the layer of the thermoplastic resin A, wherein T1 is $T_L$; then second uniaxially stretching the uniaxially stretched film at a temperature of T2 to obtain a biaxially stretched film having an angle between a molecular orientation axis in the layer of the thermoplastic resin A and a molecular orientation axis in the layer of the thermoplastic resin B of 70 degrees to 110 degrees, wherein T2 is $T_H$ and $T_H$ is higher than $T_L$.

18. The method according to claim 17, wherein an absolute value of difference between the deflection temperature under load $Ts_A$ of the thermoplastic resin A and the deflection temperature under load $Ts_B$ of the thermoplastic resin B is 5° C. or more.

19. The method according to claim 17, wherein a rupture elongation of the thermoplastic resin A at a temperature of $Ts_B$ is 50% or more and a rupture elongation of the thermoplastic resin B at a temperature of $Ts_A$ is 50% or more.

20. The method according to claim 17, wherein the thermoplastic resin A is 40 or more in Abbe number, and the thermoplastic resin B is 30 or less in Abbe number.

21. The method according to claim 17, wherein the thermoplastic resin B is 40 or more in Abbe number, and the thermoplastic resin A is 30 or less in Abbe number.

22. The method according to claim 17, wherein a stretching ratio in the second uniaxially stretching is smaller than a stretching ratio in the first uniaxially stretching.

23. A retardation film which is obtained by the method according to claim 17.

24. The retardation film according to claim 23, the retardation film satisfying a relation of $R_{450}<R_{550}<R_{650}$, wherein $R_{450}$ is a retardation value of light having a wavelength of 450 nm at an incident angle of 0 degrees, $R_{550}$ is a retardation value of light having a wavelength of 550 nm at an incident angle of 0 degrees, and $R_{650}$ is a retardation value of light having a wavelength of 650 nm at an incident angle of 0 degrees.

25. A method for producing a retardation film, comprising steps of: co-extruding or simultaneously casting a thermoplastic resin A and a thermoplastic resin B to obtain a laminated film comprising a layer of the thermoplastic resin A and a layer of the thermoplastic resin B, wherein the thermoplastic resin A has a positive or negative intrinsic birefringence, the thermoplastic resin B has an intrinsic birefringence of the same sign as a sign of the thermoplastic resin A, optimizing the thickness of the thermoplastic resin layer A and the thermoplastic resin layer B, wherein the optimizing includes determining if a first condition and a second condition are true or false, and adjusting the thickness of at least one of the thermoplastic layer A and the thermoplastic layer B if either of the first and second conditions are false, wherein the first condition is that an absolute value of a phase difference which appears in the layer of the thermoplastic resin B is smaller than an absolute value of a phase difference which appears in the layer of the thermoplastic resin A when the laminated film is stretched at a temperature of $T_L$, and the second condition is that an absolute value of a phase difference which appears in the layer of the thermoplastic resin A is smaller than an absolute value of a phase difference which appears in the layer of the thermoplastic resin B when the laminated film is stretched at a temperature of $T_H$, wherein $Ts_A$ is a deflection temperature under load of the thermoplastic resin A, $Ts_B$ is a deflection temperature under load of the thermoplastic resin B and $Ts_B$ is higher than $Ts_A$;

first uniaxially stretching the laminated film at a temperature of T1 to obtain an uniaxially stretched film having an absolute value of a phase difference in the layer of the thermoplastic resin A smaller than an absolute value of a phase difference in the layer of the thermoplastic resin B, wherein T1 is $T_H$; then second uniaxially stretching the uniaxially stretched film at a temperature of T2 to obtain a biaxially stretched film having an angle between a molecular orientation axis in the layer of the thermoplastic resin A and a molecular orientation axis in the layer of the thermoplastic resin B of 70 degrees to 110 degrees, wherein T2 is $T_L$ and $T_H$ is higher than $T_L$.

26. The method according to claim 25, wherein an absolute value of difference between the deflection temperature under load $Ts_A$ of the thermoplastic resin A and the deflection temperature under load $Ts_B$ of the thermoplastic resin B is 5° C. or more.

27. The method according to claim 25, wherein a rupture elongation of the thermoplastic resin A at a temperature of $Ts_B$ is 50% or more and a rupture elongation of the thermoplastic resin B at a temperature of $Ts_A$ is 50% or more.

28. The method according to claim 25, wherein the thermoplastic resin A is 40 or more in Abbe number, and the thermoplastic resin B is 30 or less in Abbe number.

29. The method according to claim 25, wherein the thermoplastic resin B is 40 or more in Abbe number, and the thermoplastic resin A is 30 or less in Abbe number.

30. The method according to claim 25, wherein a stretching ratio in the second uniaxially stretching is smaller than a stretching ratio in the first uniaxially stretching.

31. A retardation film which is obtained by the method according to claim 25.

32. The retardation film according to claim 31, the retardation film satisfying a relation of $R_{450}<R_{550}<R_{650}$, wherein $R_{450}$ is a retardation value of light having a wavelength of 450 nm at an incident angle of 0 degrees, $R_{550}$ is a retardation value of light having a wavelength of 550 nm at an incident angle of 0 degrees, and $R_{650}$ is a retardation value of light having a wavelength of 650 nm at an incident angle of 0 degrees.

* * * * *